United States Patent [19]

Apblett, Jr.

[11] 4,175,779
[45] Nov. 27, 1979

[54] STRESS CONTROL COLLAR

[75] Inventor: William R. Apblett, Jr., Florham Park, N.J.

[73] Assignee: Foster Wheeler Energy Corporation, Livingston, N.J.

[21] Appl. No.: 870,393

[22] Filed: Jan. 18, 1978

[51] Int. Cl.² .................. F16L 13/04; F16L 5/02; B01J 8/06
[52] U.S. Cl. ............................ 285/115; 122/360; 285/158; 285/286; 422/197; 422/240; 422/310
[58] Field of Search ............ 23/288 M; 285/115, 116, 285/158, 286; 122/360, 365; 165/DIG. 8; 422/197, 240, 310

[56] References Cited

U.S. PATENT DOCUMENTS

| 129,691 | 7/1872 | Tasker | 285/116 |
|---|---|---|---|
| 1,939,242 | 12/1933 | Thaheld | 29/148.2 |
| 1,977,240 | 10/1934 | Parker | 285/86 |
| 2,279,808 | 4/1942 | Young | 285/111 |
| 2,381,829 | 8/1945 | Livers | 285/86 |
| 2,556,544 | 6/1951 | Johnson | 285/286 X |
| 2,791,452 | 5/1957 | Watson | 285/342 |
| 2,917,822 | 12/1959 | Boice | 29/447 |
| 2,952,481 | 9/1960 | Weatherhead, Jr. | 285/116 |
| 3,343,923 | 9/1967 | Regan et al. | 23/288 M |
| 3,494,640 | 2/1970 | Coberly et al. | 285/115 |
| 3,516,692 | 6/1970 | Albrecht | 285/286 X |
| 3,635,498 | 1/1972 | Patel | 285/286 X |
| 3,730,564 | 5/1973 | Bachle et al. | 285/115 |
| 3,827,727 | 8/1974 | Moebius | 285/115 X |

Primary Examiner—Joseph Scovronek
Attorney, Agent, or Firm—Marvin A. Naigur; John E. Wilson; John J. Herguth, Jr.

[57] ABSTRACT

A collar for controlling thermal and mechanical stresses and for reducing failures caused by such stresses in gas-transfer tubings, or pigtails, used in a steam reformer. The control collar, in the form of a section of tubing and having the same alloy composition as the pigtail, is placed over each end portion of the pigtail connected to an extension member attached respectively to a catalyst tube in the steam reformer and to a gas-removal manifold. The control collar fits closely over the pigtail and is welded to the extension member. Use of the same alloy composition in the pigtail and in the control collar eliminates stresses associated with differences in thermal expansion and contraction, and the use of the collar reduces mechanical stress fatigue by displacing the point of maximum bending movement from the area of mechanical stress concentration of the weld, and the metallurgical notch in the heat-affected zone of the weld.

4 Claims, 2 Drawing Figures

STRESS CONTROL COLLAR

BACKGROUND OF THE INVENTION

This invention relates generally to mechanical joints and, more particularly, to a collar for controlling stress in a mechanical joint subjected to movement and high temperatures.

A steam reformer, also known as a steam-methane reformer, is used to produce hydrogen gas by passing a mixture of methane and steam through a heated catalyst. The catalyst is normally contained within tubes positioned within a heated chamber. In the design and construction of steam reformers and other similar equipment, the gas which is produced is transferred from the catalyst tubes to an outlet manifold by a plurality of small tubes, commonly referred to as "pigtails". The pigtails are subjected to significant bending stresses due in part to thermal expansion and contraction which occurs during start-up and shut-down of the reformer, and in part due to the bowing or bending which frequently occurs in the relatively-long catalyst tubes.

The pigtails are connected at their ends to the catalyst tube and the outlet manifold, respectfully, by extension elements, commonly called weldolets, which are conical-shaped elements having a central bore aligned with holes provided in the walls of the catalyst tube and the outlet manifold. The weldolets are welded to the surfaces of the catalyst tube and the manifold, and the ends of the pigtails, in turn, are welded to the weldolet.

Numerous failures have been experienced in the pigtails at the points where they are welded to the weldolets. These failures are the result of the concentration of stress occurring at the tip of the weld which joins the pigtail to the weldolet. These failures, which are normally cracks in the wall of the pigtails, are propagated by a combination of thermal fatigue and grain boundary oxidation caused by the stress concentration aggravated by the bending stresses.

The weld which joins the pigtail to the weldolet, in addition to creating a mechanical notch with the concomitant stress concentration associated therewith, also degrades the yield strength of the material in the heat-affected zone of the weld, thus also causing a metallurgical notch.

SUMMARY OF THE INVENTION

Accordingly, it is an object of the present invention to provide a control collar to reduce stress-related failures in mechanical joints.

Another object of the present invention is to provide a control collar of the above type which reduces failures caused by thermal fatigue and grain boundary oxidation in a weld.

Yet another object of the present invention is to provide a control collar of the above type which does not degrade the yield strength of the material in the heat-affected zone of the weld.

A further object of the present invention is to provide a control collar of the above type which increases the reliability of welded joints.

A still further object of the present invention is to provide a control collar of the above type which reduces failures caused by thermal stress and fatigue occurring in welded conduits used for conducting gases from a steam reformer.

Toward the fulfillment of these and other objects, the stress control collar of the present invention is of the same alloy composition as the gas-transfer tubing, or pigtail, used in a steam reformer, and is placed over the outer diameter of the pigtail in the area where the pigtail is welded to a weldolet of the steam reformer. In preparing this joint, the pigtail is first welded to the weldolet with a fillet weld, and then the stress control collar is welded to the pigtail at the point of its attachment to the weldolet. The inner diameter of the stress control collar closely fits over the outer diameter of the pigtail, and the inner edge of the free end of the control collar is shaped to provide a smooth contour at the point of maximum bending movement of the control collar, thus removing a possible point of contact between the control collar and the pigtail as the pigtail bends due to thermal stresses and physical movement within the steam reformer.

BRIEF DESCRIPTION OF THE DRAWINGS

The above description, as well as further objects, features and advantages of the present invention, will be more fully appreciated by reference to the following description of a presently-preferred but nonetheless illustrative embodiment in accordance with the present invention, when taken in connection with the accompanying drawings, wherein.

DESCRIPTION OF THE PREFERRED EMBODIMENT

Figure 1:
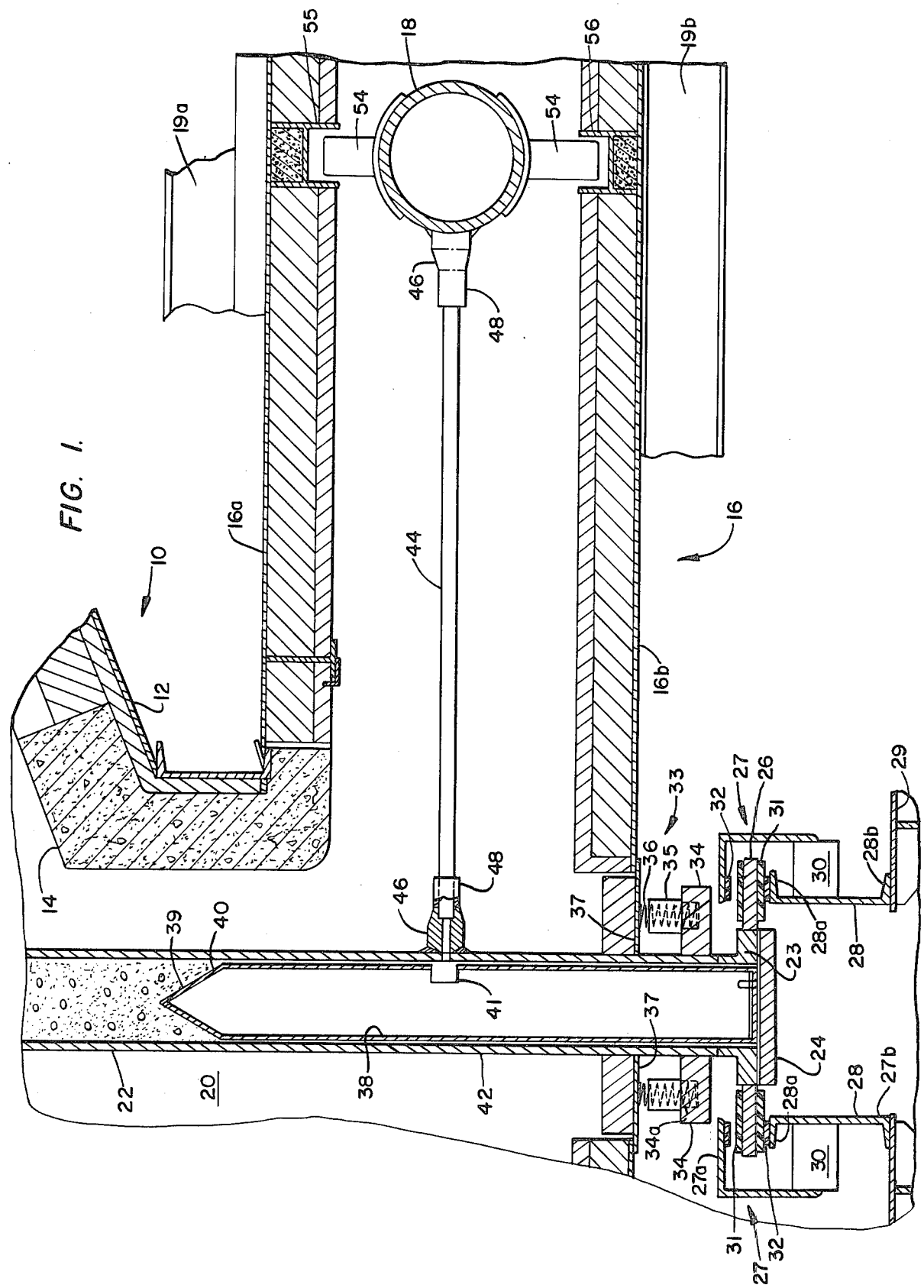
FIG. 1 is a cross-sectional view of a portion of a steam reformer showing the stress control collars of the present invention provided at the ends of a gas-transfer tubing.

Referring specifically to FIG. 1 of the drawings, the reference numeral 10 refers generally to a steam reformer, only a portion of which is shown, which is defined in part by an exterior wall 12 provided on its inner surface with a suitable, thermal insulation material 14. A manifold box 16 extending to the right in FIG. 1 is defined by an upper wall 16a, which is attached at one edge to the wall 12 of the steam reformer 10, and a parallel lower wall 16b. While not specifically shown, it is understood that front, back and end walls are positioned cooperatively with the upper and lower walls 16a and 16b, respectively, to complete the structure of the manifold box 16 enclosing an outlet manifold 18, which will be described more fully below. The upper and lower walls 16a and 16b of the manifold box 16 are appropriately supported by support elements 19a and 19b, respectively, which, while not specifically shown, are suitably attached at one end to the wall 12 of the steam reformer 10.

Positioned within the interior 20 of the steam reformer 10 is a plurality of catalyst tubes 22, one of which is shown in FIG. 1. The catalyst tubes 22 are normally positioned in parallel rows, with each row extending perpendicularly to the plane of FIG. 1, and extend vertically within the steam reformer 10.

The catalyst tube 22 may be an elongated, cylindrical tube of a suitable, heat-resistant material, which is open at its upper end (not shown). As an illustrative example only, the catalyst tube 22 may be four to six inches in diameter and 30 to 40 feet in length. As shown in FIG. 1, the lower portion of the catalyst tube 22 is provided with an outer, circumferential flange 23, to which is attached a disk 24 which closes the bottom of the catalyst tube.

To accommodate movement of the catalyst tube 22 resulting from the bowing of the tube along its length and thermal expansion and contraction, each tube is supported to permit a limited degree of movement vertically and transversely, into and from the plane of FIG. 1. To this end, an annular support ring 26 is secured to the outer periphery of the flange 23. A support assembly, which includes a pair of upper support elements 27 and a pair of lower support elements 28 positioned diametrically with respect to the catalyst tube 22, is provided which cooperates with the support ring 26 to permit movement of the catalyst tube in the directions indicated above. Each lower support element 28 may be a conventional beam of C-shape cross section having spaced, parallel flanges 28a and 28b, with the lower flange 28b being secured to a frame member 29. Each upper support element 27 may also be a conventional, structural element, such as a right-angle bar, which is connected to its corresponding lower support element 28 by a spacer block 30 with a horizontal side 27a of the upper support element positioned parallel to the upper flange 28a of the lower support element. Each side 27a and its corresponding upper flange 28a are spaced sufficiently to permit the support ring 26 to be disposed therebetween and to be provided with a limited degree of vertical movement.

Normally, the weight of the catalyst tube 22 is transmitted by the support ring 26 to the upper flanges 28a of the support elements 28. To reduce friction as the support ring 26 slides along the upper flanges 28a, the upper and lower surfaces of the support ring are provided with antifriction elements 31 of a suitable material, such as Teflon disks. The parallel surfaces of the upper flanges 28a and the sides 27a of the support elements 28 and 27, respectively, which cooperate with the support ring 26, are also provided with anti-friction elements 32.

A pair of biasing assemblies 33 is provided for each catalyst tube 22 which biases the support ring 26 in supporting contact with the flanges 28a. Each biasing assembly 33 includes a support tab 34, which may be a ring, or two separate elements diametrically attached to the outer surface of the catalyst tube 22, provided adjacent to the lower portion of the catalyst tube. A tubular sleeve 35 is affixed to the upper surface of each support tab 34, and a resilient element 36, such as a spring, is disposed within the sleeve. One end of each resilient element 36 rests within a recess 34a provided in the surface of the support tab 34, and the other end extends beyond the upper edge of the sleeve 35 and presses against the lower surface of a plate 37 attached to the catalyst tube 22. One edge of the lower wall 16b of the manifold box 16 rests on the plate 37. By this arrangement, the wall 16b is resiliently supported at one edge, and the weight of the wall tends to counteract vertical movement of the catalyst tube 22, causing the catalyst tube to rest on the support element 28.

An elongated catalyst support tube 38, which is closed at both ends, is concentrically disposed within the catalyst tube 22. The lower end of the catalyst support tube 38 rests on the disk 24, and the upper end is closed by a conical top 39. The conical top 39 of the support tube 38 is provided with perforations 40 to permit the passage therethrough of the gas produced in the catalyst tube 22. An opening 41 is provided in the wall of the catalyst support tube 38 to provide means through which the gas within the interior of the catalyst support tube may be discharged. The outer diameter of the catalyst support tube 38 is smaller than the inner diameter of the catalyst tube 22 to provide an annular space 42 between these tubes. A quantity of catalyst is placed within the catalyst tube 22 to form a column supported by the conical top 39 of the catalyst support tube 38. Any suitable catalyst which reacts with a mixture of steam and methane to produce hydrogen may be used, such as ceramic elements in the form of rings which are coated with nickel.

Figure 2:
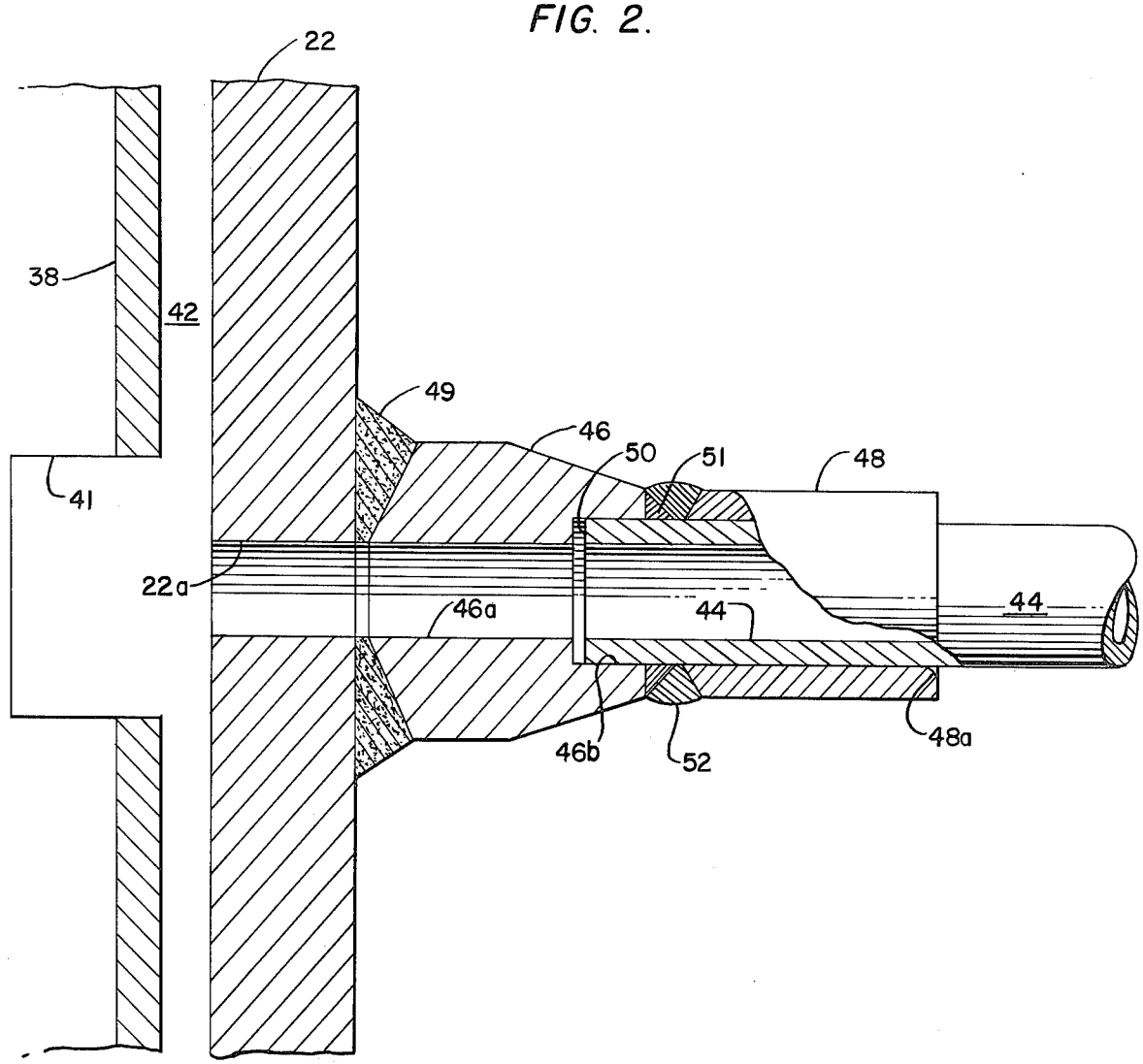
FIG. 2 shows, to an enlarged scale, one of the stress control collars of FIG. 1.

With continuing reference to FIG. 1, the structure for removing the gas from the catalyst tube 22 to the outlet manifold 18 includes a gas-transfer tubing or pigtail 44 which is attached at its ends to extension outlets or weldolets 46 and provided with a control collar 48. The details of the joint between the ends of the pigtail 44 and the catalyst tube 22 at one end and the outlet manifold 18 at the other end are shown in FIG. 2. Since the joint between the pigtail 44 and the catalyst tube 22 is identical to the joint between the pigtail and the outlet manifold 18, the description of FIG. 2 is applicable to both joints.

As shown in FIG. 2, an opening 22a is provided in the wall of the catalyst tube 22, at a vertical elevation substantially aligned with the opening 41 provided in the catalyst support tube 38. The weldolet 46 is provided with an internal bore 46a of substantially the same diameter as the opening 22a in the catalyst tube 22, and the weldolet is suitably attached to the exterior wall of the catalyst tube, such as by a weld 49, so that the bore and the opening are horizontally aligned. The free end of the weldolet 46, which may be of a truncated-cone configuration, has a counterbore 46b concentric with the bore 46a, but of a larger diameter. The diameter of the counterbore 46b is sufficient to receive the end of the pigtail 44, and the pigtail is positioned within the counterbore to provide a narrow gap 50 between the end of the pigtail and the end of the counterbore. The pigtail 44 is suitably attached to the end of the weldolet 46, such as by a fillet weld 51, and is supported by the weldolet.

The control collar 48 is concentrically positioned over the portion of the pigtail 44 which is adjacent to the weldolet 46. As shown in FIG. 2, the control collar 48 may be a length of tubing having an inner diameter just slightly larger than the outer diameter of the pigtail 44 to permit sliding of the collar onto the pigtail. The end of the collar 48 which is adjacent to the weldolet 46 is attached to the fillet weld 51 and to the pigtail 44 by another weld 52. The inner circumferential edge 48a of the free end of the control collar 48 adjacent to the surface of the pigtail 44 is provided with a smooth contour so that when the pigtail bends as a result of the differences in the thermal expansion and contraction between the catalyst tube 22 and the outlet manifold 18, the control collar has no sharp edges which could damage the surface of the pigtail.

The material of the control collar 48 is the same as the material of the pigtail 44 so that the coefficient of the thermal expansion of the material of the two elements are identical to eliminate any possibility of thermal stresses being induced by different rates of expansion due to differences in materials. As an example only, the pigtail 44 and the control collar 48 may be made from an alloy commonly known as Incoloy 800, a material which is suitable for high-temperature applications.

The outlet manifold 18 may be a tubing of suitable size and material, and is positioned with its longitudinal axis extending perpendicularly to the plane of FIG. 1. To accommodate motion transmitted to the outlet manifold 18 from the catalyst tube 22 by the pigtail 44, the outlet manifold is supported to permit transverse and longitudinal motion relative to its longitudinal axis, as seen in FIG. 1. To accomodate the movement along its longitudinal axis, the outlet manifold 18 is provided with longitudinally-extending runners 54, which are positioned diametrically along the surface of the outlet manifold and extend substantially the length of the outlet manifold. The runners 54 cooperate with upper and lower guide channels 55 and 56, respectively, which are attached to the inner surfaces of the upper and lower walls 16a and 16b. The outlet manifold 18 is also provided at predetermined intervals along its length with elastic support assemblies (not shown), which may be structurally similar to the biasing assembly 33 which cooperate with the catalyst tube 22. These elastic support assemblies permit a limited degree of vertical motion of the outlet manifold 18 and the pigtail 44 attached thereto. As shown in FIG. 1, the inner surfaces of the walls 16a and 16b of the manifold box 16, as well as the guide channels 55 and 56 are lined with suitable thermal insulation material to protect these structures.

In operation, the interior 20 of the steam reformer 10 is heated in a known manner, such as with natural gas or fuel oil, to approximately 1,000° to 1,100° F. Each of the catalyst tubes 22 within the steam reformer 10 is provided with a charge of catalyst to a suitable height within the catalyst tube. A mixture of steam and methane is introduced by suitable means (not shown) through the open, upper end of each of the catalyst tubes 22, with the mixture flowing downwardly through the catalyst column. The hydrogen gas produced by reaction between the steam and methane in the presence of the catalyst and high temperature is collected in the annular space 42 between the catalyst tube 22 and the catalyst support tube 38, and also in the interior volume of the catalyst support tube since the hydrogen gas may pass through the perforations 40 in the conical top 39 of the catalyst support tube. A portion of the steam-methane mixture will also pass through the perforations 40, and will collect in the bottom of the catalyst support tube 38 and be removed by conventional means which have not been shown.

The hydrogen gas which is collected within the catalyst support tube 38 passes through the opening 41 and, along with the gas which has collected in the space 42, passes through the opening 22a in the wall of the catalyst tube 22. The hydrogen gas then flows through the central bore 46a of the weldolet 46 and the interior passage of the pigtail 44, and into the outlet manifold 18 through an opening (not shown) provided in the wall of the manifold, which may be substantially similar to the opening 22a in the wall of the catalyst tube 22.

During start-up and shut-down of the steam reformer 10 and during normal operations, thermal expansion and contraction and bowing of the catalyst tube 22 along its length will produce sliding and vertical movement of the catalyst tube, which are effectively accomodated by the annular support ring 26 and the support assembly including support elements 27 and 28, in the manner described above. Similarly, vertical and longitudinal movement of the outlet manifold 18 are also effectively accommodated in the manner described above. Since the control collar 48 and the pigtail 44 are both made of the same material, there are no thermal stresses induced by differential thermal expansion and contractions. Differential movement between the catalyst tube 22 and the outlet manifold 18 are effectively countered by the manner in which these two elements are suspended and supported so that differential displacements do not adversely affect the structural integrity or function of the pigtail 44, or the interconnection between the pigtail and the weldolet 46, the catalyst tube 22, or the manifold 18.

The length of the control collar 48 is sufficient to displace the point of maximum bending movement of the pigtail 44, from the normal location in the vicinity of the fillet weld 51 when a control collar is not used, to the vicinity of the free end of the control collar. The point of maximum bending movement is accordingly moved away from a zone of potential mechanical stress concentration and metallurgical weakness to the end of the control collar which is not near a weld, and is further from any part of the assembly subjected to a welding operation.

While not specifically shown in the drawings, it is understood that a pigtail 44 would connect each of the plurality of catalyst tubes 22 to a suitable opening provided in the outlet manifold 18, and the pigtails would be disposed substantially parallel to the pigtail shown in FIG. 1. It is understood, of course, that each of these pigtails will be provided at both ends with a control collar 48, such as shown more particularly in FIG. 2. Also, while not specifically shown in the drawings to enhance the clarity of presentation, it is understood that the steam reformer 10, the assembly of catalyst tubes 22, and the outlet manifold 18, as well as the structures associated therewith are appropriately supported to permit operation and cooperation in substantially the manner herein described.

Of course, variations of the specific construction and arrangement of the steam reformer and the control collar disclosed above can be made by those skilled in the art without departing from the invention as defined in the appended claims.

I claim:

1. A welded interconnection for connecting a cylindrical member in registry with an opening extending through a second member, said members being subjected to thermally induced relative bending therebetween, said interconnection comprising a tubular extension connected at one end to said second member and defining a through bore in registry with said opening, said tubular extension having a counterbore at its other end for receiving an end portion of said cylindrical member, a first weld connecting said other end of said tubular extension to an outer surface portion of said cylindrical member, a collar for displacing from the region of said weld the mechanical stress caused by said bending, said collar extending over a portion of said cylindrical member with the inner end of said collar located proximate to said first weld, and a second weld connecting said inner end of said collar with said first weld and said cylindrical member, said collar being fabricated from the same material as said cylindrical member.

2. The interconnection of claim 1, wherein said tubular extension is connected to said second member by an additional weld.

3. The interconnection of claim 1, wherein the inner circumferential edge of the other end of said collar is provided with a smooth contour.

4. The interconnection of claim 1, wherein said collar has an inner diameter just slightly larger than the outer diameter of said cylindrical member.

* * * * *